Oct. 7, 1952     C. P. KRUPP     2,612,910
FLEXIBLE HOSE
Filed Nov. 12, 1948     2 SHEETS—SHEET 1
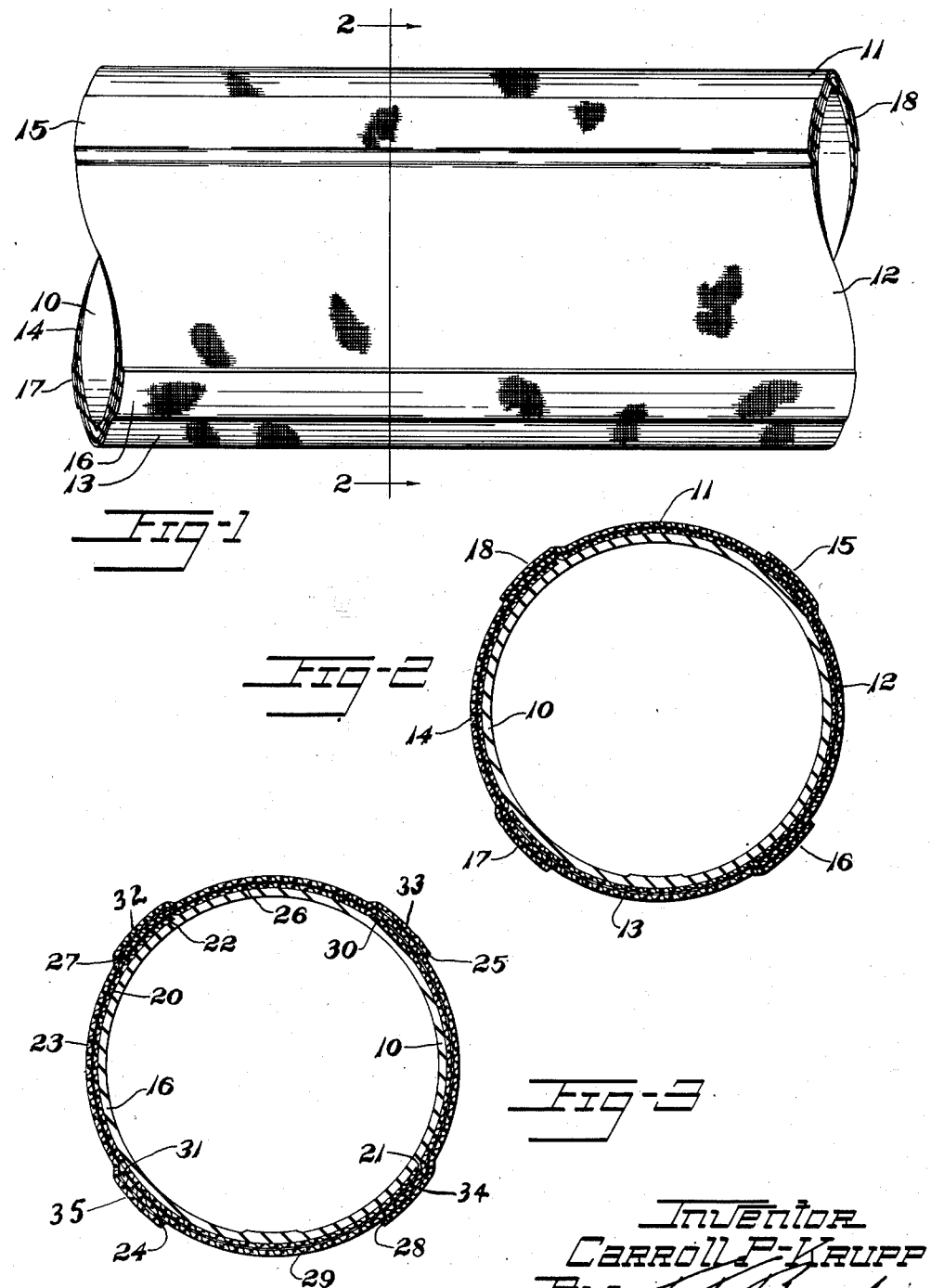

Oct. 7, 1952   C. P. KRUPP   2,612,910
FLEXIBLE HOSE
Filed Nov. 12, 1948   2 SHEETS—SHEET 2
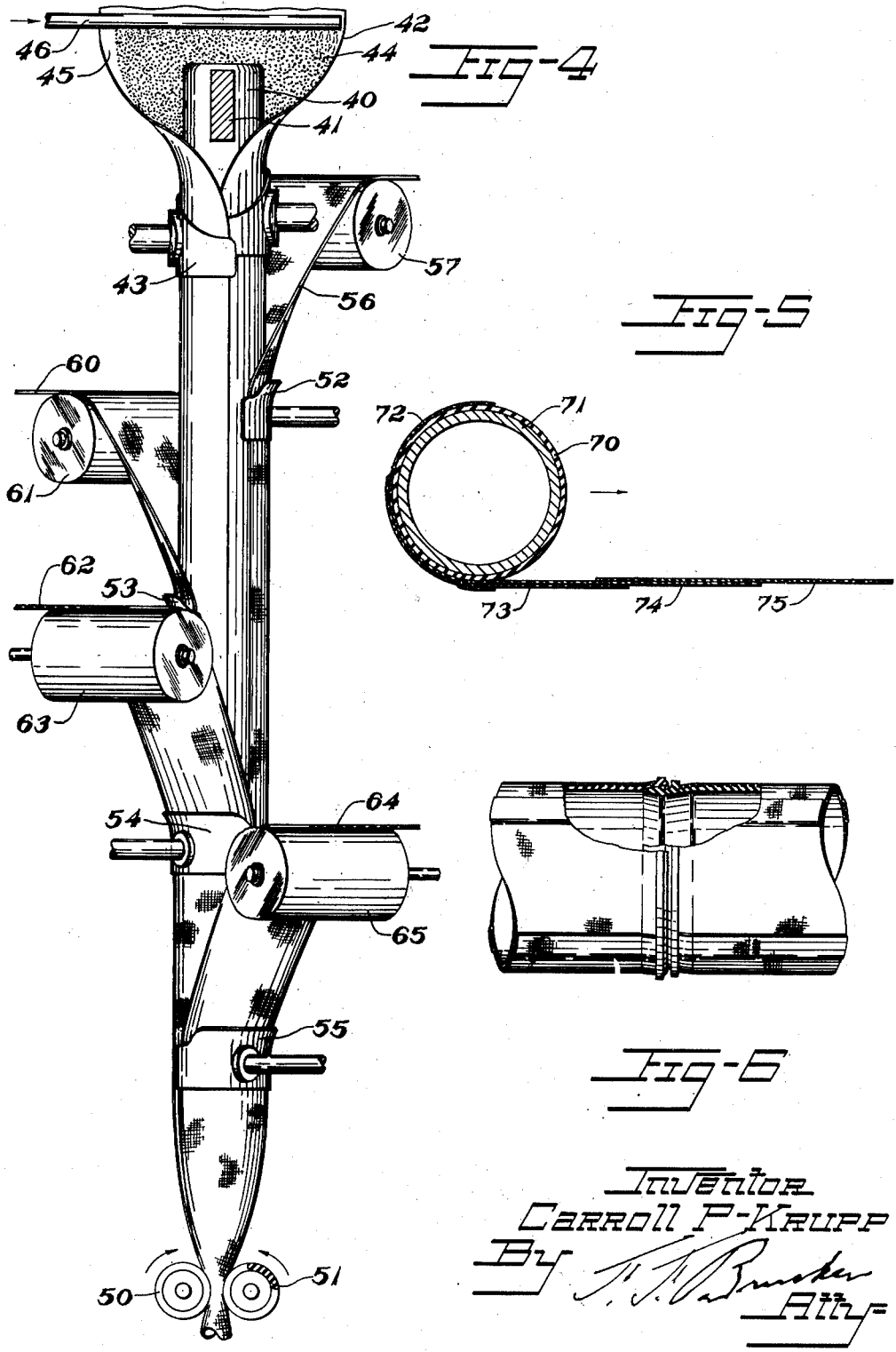

Patented Oct. 7, 1952

2,612,910

UNITED STATES PATENT OFFICE 2,612,910

FLEXIBLE HOSE

Carroll P. Krupp, Cuyahoga Falls, Ohio, assignor to The B. F. Goodrich Company, New York, N. Y., a corporation of New York Application November 12, 1948, Serial No. 59,500

10 Claims. (Cl. 138—55)

This invention relates to the manufacture of hose and is especially useful in the manufacture of hose of relatively thin wall and large diameter although the invention is also useful in the manufacture of other hose or reinforced tubing.

In the manufacture of thin-walled hose it has been the practice to wind rubberized fabric upon itself to provide a tubular body which may have a lining of rubber-like material and may also have an outer cover of rubber-like material. For use in extinguishing fires and for other emergency purposes where it is desired to handle hose with speed, it has been found that the light-walled hose tended to stretch unequally at different zones about its circumference when under pressure thereby bending the hose. Such hose must be light in weight to facilitate handling and must be adapted to be flattened readily to permit reeling.

The present invention aims to provide a hose construction which will lay straight when under pressure and which may be flattened for reeling.

Other objects of the invention are to provide a balanced arrangement of splices, to provide a novel method of manufacture, and to provide a light weight hose suitable for rapid coupling.

These and other objects will appear from the following description and the accompanying drawings.

Of the drawings,

Fig. 1 is a side elevation of a hose constructed in accordance with and embodying the invention.

Fig. 2 is a cross-sectional view thereof taken on line 2—2 of Fig. 1.

Fig. 3 is a view similar to Fig. 2 showing another embodiment of the invention.

Fig. 4 is a view of apparatus which may be employed in constructing the hose of the invention.

Fig. 5 is a view illustrating another method of producing the hose of the invention.

Fig. 6 is a view showing two sections of hose of the invention with flexible hose coupling members applied thereto.

Referring to the drawings, the numeral 10 designates an impervious tubular lining of rubber composition or other rubber-like material. About the lining and enclosing the same are strips 11, 12, 13, and 14 of fabric extending longitudinally of the hose. These strips have overlapping longitudinal margins providing lapped seams 15, 16, 17, 18 equally spaced from each other circumferentially of the hose in balanced relation. In the embodiment of the invention illustrated in Fig. 2, each strip exceeds in width one-half of the circumference of the hose, thereby providing two layers of fabric between each two seams and three layers of fabric at each seam so that one ply of fabric extends entirely through the seam. Also each strip of fabric extends circumferentially through three of the seams.

In the form of the invention shown in Fig. 2, each strip of fabric extends in a counter-clockwise direction with one margin thereof adjacent the rubber lining of the hose and the other margin exposed at the outer face of the hose reinforcement. The strips may also be arranged to extend in a clockwise direction if desired. All of the strips are of the same width and stretchability.

In the form of the invention illustrated in Fig. 3, the strips of fabric are so arranged that both margins 21, 22 of strip 20 are at positions adjacent the rubber lining, the strip 23 has both its margins 24, 25 at the outer face of the hose, the strip 26 has one margin 27 between strips 20 and 23 and its other margin 28 at the outer face of the hose, and the strip 29 has one margin 30 adjacent the hose lining and its other margin 31 between strips 20 and 23. In this embodiment, the strips 20, 23, 26 and 29 are all of the same width and provide overlapping longitudinal seams 32, 33, 34, 35 arranged equally spaced about the circumference of the hose and of the same stretchability. The width of the strips is less than the circumference and greater than half the circumference of the hose and preferably exceeds one half the circumference by the desired width of the seams. The strips also each extend circumferentially of the hose through three of the seams. The embodiment of Fig. 3 has an advantage over the embodiment of Fig. 2 in that only three margins are exposed at the outer face of the hose.

It is also within the invention to provide a hose having an odd number of longitudinal seams, for example three, in which case the strips each have a width equal to the length of the arc of 240 degrees of the circumference plus the width of a seam. In any case, the width of the strips is equal to the circumference of the hose divided by one half of the number of strips plus the width of overlap of the seams desired.

The fabric strips are preferably of square woven or other woven fabric with the warp elements running lengthwise of the strips and the weft elements crosswise thereof and the warp and weft elements may be of the same or different strengths. As the force due to internal pressure tending to split the hose lengthwise is always twice as great as the force of internal pressure tending to separate the hose on a plane perpendicular to its axis, the elements of the strip extending crosswise thereof or circumferentially of the hose may be made stronger than the elements extending lengthwise of the strips or longitudinally of the hose, if desired, for economy of material. The strips are coated with adhesive rubber or other rubber-like material to provide good adhesion of the strips to each other.

As the thickness of reinforcing material at the seams is greater than that between the seams the hose has greater resistance to stretching at the seams. Since the seams are all of equal width and are equally spaced about the hose, the construction is balanced and internal pressure in the hose does not bend the hose.

In the manufacture of the hose of this invention, the strips of fabric may be fed over a stationary mandrel and assembled thereabout in the desired overlapping relation. This is illustrated in Fig. 4 where the numeral 40 designates a stationary mandrel supported by an arm 41 at one end thereof. A strip 42 of unvulcanized rubber or other rubber-like material may be advanced from any source, such as a supply roll (not shown) along the mandrel and through a stationary folder or former 43 where it is folded into overlapping relation of its margins and about the mandrel. To permit travel of the strip along the mandrel a coating 44 of soapstone powder or other lubricant may be applied to the inner face of the strip except along the margin 45 which is left adhesive for providing the overlapping seam. The lubricant dust may be applied by a spray pipe 46.

After the rubber lining has been formed about the mandrel, the lining so formed is drawn along the mandrel by feed rollers 50, 51. Between the feed rollers 50, 51 and the folder 43 a series of folders 52, 53, 54, 55 corresponding in number to the fabric reinforcing strips are fixed along the mandrel. The first fabric strip 56 is fed from a supply (not shown) over a guide roller 57 and about the former 52 into engagement with the rubber lining. The second strip 60 is fed over a guide roller 61 into the desired overlapping relation with strip 56. The third strip 62 is similarly fed over roller 63 and about former 54 and the fourth strip 64 is fed over guide roller 65 to former 55. The formers 52, 53, 54, 55 may be arranged to feed the strips into the desired overlapping relation as shown in Fig. 2 or as in Fig. 3. The assembled hose is withdrawn by rollers 50, 51 and may be vulcanized in any desired manner.

The hose of the invention is especially desirable for use with the couplings shown and described in my copending application Serial No. 792,531, filed December 18, 1947, entitled Hose Coupling Patent No. 2,567,773. Where such couplings are to be employed, the hose may be cut to the desired lengths before being vulcanized and the molded coupling members may be cemented to the ends of the hose and vulcanized thereon during vulcanization of the hose. The sections of hose may then be coupled as shown in Fig. 6.

An alternate method of making the hose is illustrated in Fig. 5. As shown in that figure, the lining 70 is formed by winding a sheet of rubber material about a mandrel 71. The fabric reinforcing strips 72, 73, 74, 75 may then be applied about the lining either separately or as a unit. Where applied as a unit, the strips may be overlapped and joined together, longitudinal margin to longitudinal margin on a flat table. The unit may then be wound about the lining. When coupling members are to be applied as in Fig. 6, these may be either slipped over the mandrel before the other material is applied thereto or may be applied on the unvulcanized hose, or may be applied over the rubber lining and under the fabric reinforcement as desired. The hose may be vulcanized while on the mandrel in an open steam vulcanizer or by any ordinary method of vulcanizing hose and then removed from the mandrel.

Variations may be made without departing from the scope of the invention as it is defined by the following claims.

I claim:

1. A flexible hose comprising a tubular wall having a reinforcement of square-woven fabric strips extending longitudinally of the hose, said strips being of width less than the circumference of the hose and overlapping each other at longitudinal margins thereof to provide a plurality of lapped seams extending longitudinally of the hose in equally spaced-apart relation thereabout and of equal extensibility, said strips each being equal in width to the circumference of the hose divided by one half of the number of strips plus the width of a seam and one of said strips having both its margins exposed at the outer face of the reinforcement.

2. A flexible hose comprising a tubular wall of strips of woven fabric extending longitudinally of the hose with their margins in overlapping relation and providing seams spaced apart uniformly throughout the circumference of the hose, said overlapping seams being of equal extensibility and the material between successive seams being of uniform thickness and extensibility, each strip comprising warp elements extending longitudinally thereof and weft elements extending circumferentially of the hose, said longitudinal elements being of less strength than the elements extending circumferentially of the hose, and the uniform extensibility of the strips and uniform distribution of the seams providing balanced resistance to elongation about the wall under fluid pressure within the hose.

3. A flexible hose comprising a tubular wall of strips of woven fabric extending longitudinally of the hose with their margins in overlapping relation and providing seams spaced apart uniformly throughout the circumference of the hose, and overlapping seams being of equal extensibility and the material between successive seams being of uniform thickness and extensibility, and each of said strips spanning at least three of said seams.

4. A flexible hose comprising a tubular wall of strips of woven fabric extending longitudinally of the hose with their margins in overlapping relation and providing seams spaced apart uniformly throughout the circumference of the hose, and overlapping seams being of equal extensibility and the material between successive seams being of uniform thickness and extensibility, said wall being at least equal in thickness to two of said strips at all positions between said seams.

5. A flexible hose comprising a tubular wall of strips of woven fabric extending longitudinally of the hose with their margins in overlapping relation and providing seams spaced apart uniformly throughout the circumference of the hose, and overlapping seams being of equal extensibility and the material between successive seams being of uniform thickness and extensibility, said seams being at least equal in thickness to three of said strips.

6. A flexible hose comprising a tubular wall having an impervious tubular lining of rubber material and a reinforcement of fabric strips of equal width and extensibility extending longitudinally of the hose parallel to its axis at circumferentially successive positions about the lining, the longitudinal margins of circumferentially successive strips overlapping one another by equal amounts in a plurality of overlapped seams of equal width and extensibility extending longitudinally of the hose in equally spaced relation about its circumference providing balanced resistance to elongation about the wall under fluid pressure within the hose and the thickness of the reinforcement at the regions of the overlapped seams being greater than the thickness of the reinforcement therebetween.

7. A flexible hose comprising a tubular wall having an impervious tubular lining of rubber material and a reinforcement of fabric strips of equal width and extensibility extending longitudinally of the hose parallel to its axis at circumferentially successive positions about the lining, the width of each strip being less than the circumference of the lining, the longitudinal margins of circumferentially successive strips overlapping one another by equal amounts in a plurality of overlapped seams of equal width and extensibility extending longitudinally of the hose in equally spaced relation about its circumference providing balanced resistance to elongation about the wall under fluid pressure within the hose.

8. A flexible hose comprising a tubular wall having an impervious tubular lining of rubber material and a reinforcement of fabric strips of equal width and extensibility extending longitudinally of the hose parallel to its axis at circumferentially successive positions about the lining, said strips each being equal in width to the circumference of the hose divided by one half of the number of strips plus the width of an overlapping seam, the longitudinal margins of circumferentially successive strips overlapping one another by equal amounts to provide a plurality of overlapped seams of equal width and extensibility extending longitudinally of the hose in equally spaced relation about its circumference providing balanced resistance to elongation about the wall under fluid pressure within the hose.

9. A flexible hose comprising a tubular wall having an impervious tubular lining of rubber material and a reinforcement of fabric strips of equal width and extensibility extending longitudinally of the hose parallel to its axis at circumferentially successive positions about the lining, the longitudinal margins of circumferentially successive strips overlapping one another by equal amounts in a plurality of overlapped seams of equal width and extensibly extending longitudinally of the hose in equally spaced relation about its circumference providing balanced resistance to elongation about the wall under fluid pressure within the hose, and each strip having one of its margins exposed at the outer surface of the reinforcement and its other margin exposed at the inner surface of the reinforcement, and the thickness of the reinforcement at the regions of the overlapped seams being greater than the thickness of the reinforcement therebetween.

10. A flexible hose comprising a tubular wall having an impervious tubular lining of rubber material and a reinforcement of straight-laid woven fabric strips of equal width and extensibility extending longitudinally of the hose parallel to its axis at circumferentially successive positions about the lining, each strip having warp elements extending longitudinally of the strip and weft elements extending crosswise of the strip, the longitudinal margins of circumferentially successive strips overlapping one another by equal amounts in a plurality of overlapped seams of equal width and extensibility extending longitudinally of the hose in equally spaced relation about its circumference providing balanced resistance to elongation about the wall under fluid pressure within the hose.

CARROLL P. KRUPP.

REFERENCES CITED

The following references are of record in the file of this patent:

UNITED STATES PATENTS

| Number | Name | Date |
|---|---|---|
| 298,321 | Stuck | May 6, 1884 |
| 2,763,106 | Snyder | June 10, 1930 |
| 1,810,585 | Young | June 16, 1931 |
| 1,906,320 | Lammertse et al. | May 2, 1933 |